United States Patent
Liu et al.

(10) Patent No.: US 11,650,263 B1
(45) Date of Patent: May 16, 2023

(54) SYSTEM FOR DETERMINING POWER CONSUMPTION BY DEVICES

(71) Applicant: HEADSPIN, INC., Palo Alto, CA (US)

(72) Inventors: Christopher Kwan Liu, Sunnyvale, CA (US); Brien Colwell, Redwood City, CA (US)

(73) Assignee: HEADSPIN, INC., Palo Alto, CA (US)

( * ) Notice: Subject to any disclaimer, the term of this patent is extended or adjusted under 35 U.S.C. 154(b) by 0 days.

(21) Appl. No.: 17/448,778

(22) Filed: Sep. 24, 2021

Related U.S. Application Data

(63) Continuation of application No. 17/105,220, filed on Nov. 25, 2020, now Pat. No. 11,221,375.

(51) Int. Cl.
*G01R 31/40* (2020.01)
*G01R 21/00* (2006.01)
*H02J 13/00* (2006.01)

(52) U.S. Cl.
CPC .......... *G01R 31/40* (2013.01); *G01R 21/002* (2013.01); *H02J 13/00002* (2020.01)

(58) Field of Classification Search
CPC .. G01R 31/40; G01R 21/002; H02J 13/00002
USPC .................... 324/764.01, 537, 500
See application file for complete search history.

(56) References Cited

U.S. PATENT DOCUMENTS

| | | | | |
|---|---|---|---|---|
| 11,086,755 B2* | 8/2021 | Gaier | ............... | G06F 11/3419 |
| 11,114,864 B2* | 9/2021 | Zhong | ............... | H02J 3/381 |
| 11,221,375 B1* | 1/2022 | Liu | ............... | H04Q 9/00 |
| 11,240,939 B2* | 2/2022 | Fan | ............... | H05K 7/20836 |
| 11,372,744 B1* | 6/2022 | Colwell | ............... | G06F 11/3692 |
| 11,430,524 B2* | 8/2022 | Bohnstingl | ............... | G11C 16/26 |

\* cited by examiner

*Primary Examiner* — Giovanni Astacio-Oquendo
(74) *Attorney, Agent, or Firm* — Lindauer Law, PLLC

(57) ABSTRACT

The power consumption associated with use of an application is determined by causing one or more devices to execute the application. The state of the power source for each device is determined before, during, and after execution of the application. The state may include an amount of power discharged by the power source, an amount of power used to maintain a charge level of the power source, or a difference between a baseline power use and the amount of power consumed during use of the application. The determined states for the power sources of each device are used to generate an output that indicates periods of high and low power use. The output may associate these periods of power use with different characteristics of the functions that were performed during those time periods or of the devices. Using the output, a developer may optimize power use associated with an application.

20 Claims, 6 Drawing Sheets

SYSTEM FOR DETERMINING POWER CONSUMPTION BY DEVICES

PRIORITY

This application is a continuation of and claims priority to U.S. patent application Ser. No. 17/105,220, filed Nov. 25, 2020, entitled "System for Determining Power Consumption by a Test Device". U.S. patent application Ser. No. 17/105,220 is incorporated by reference herein in its entirety.

INCORPORATION BY REFERENCE

U.S. patent application Ser. No. 14/850,798, filed Sep. 10, 2015, and titled "System for Application Test", now U.S. Pat. No. 9,681,318, is hereby incorporated by reference in its entirety.

U.S. patent application Ser. No. 14/976,480, filed Dec. 21, 2015, and titled "System for Network Characteristic Assessment", now U.S. Pat. No. 9,749,888, is hereby incorporated by reference in its entirety.

U.S. patent application Ser. No. 15/439,755, filed Feb. 22, 2017, and titled "Adaptive Application Behavior Based on Assessed Network Characteristics", now U.S. Pat. No. 10,178,569, is hereby incorporated by reference in its entirety.

U.S. patent application Ser. No. 15/425,652, filed Feb. 6, 2017, and titled "System for Management of an Array of Proxy Access Devices", now U.S. Pat. No. 10,855,789, is hereby incorporated by reference in its entirety.

U.S. patent application Ser. No. 15/783,859, filed Oct. 13, 2017, and titled "System for Testing Using Remote Connectivity" is hereby incorporated by reference in its entirety.

U.S. patent application Ser. No. 16/694,886, filed Nov. 25, 2019, and titled "System for Identifying Issues During Testing of Applications" is hereby incorporated by reference in its entirety.

U.S. patent application Ser. No. 15/941,674, filed Mar. 30, 2018, and titled "Interactive Application Testing System Using Remote Resources" is hereby incorporated by reference in its entirety.

BACKGROUND

An application may function differently at different locations, on different devices, and under different network conditions. For example, the battery power of a device that is consumed when executing an application may be affected by the particular functions that are performed, the components of the device, or various network conditions. Acquiring information about the characteristics of the application, device, and network may be useful to improve performance of the application.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
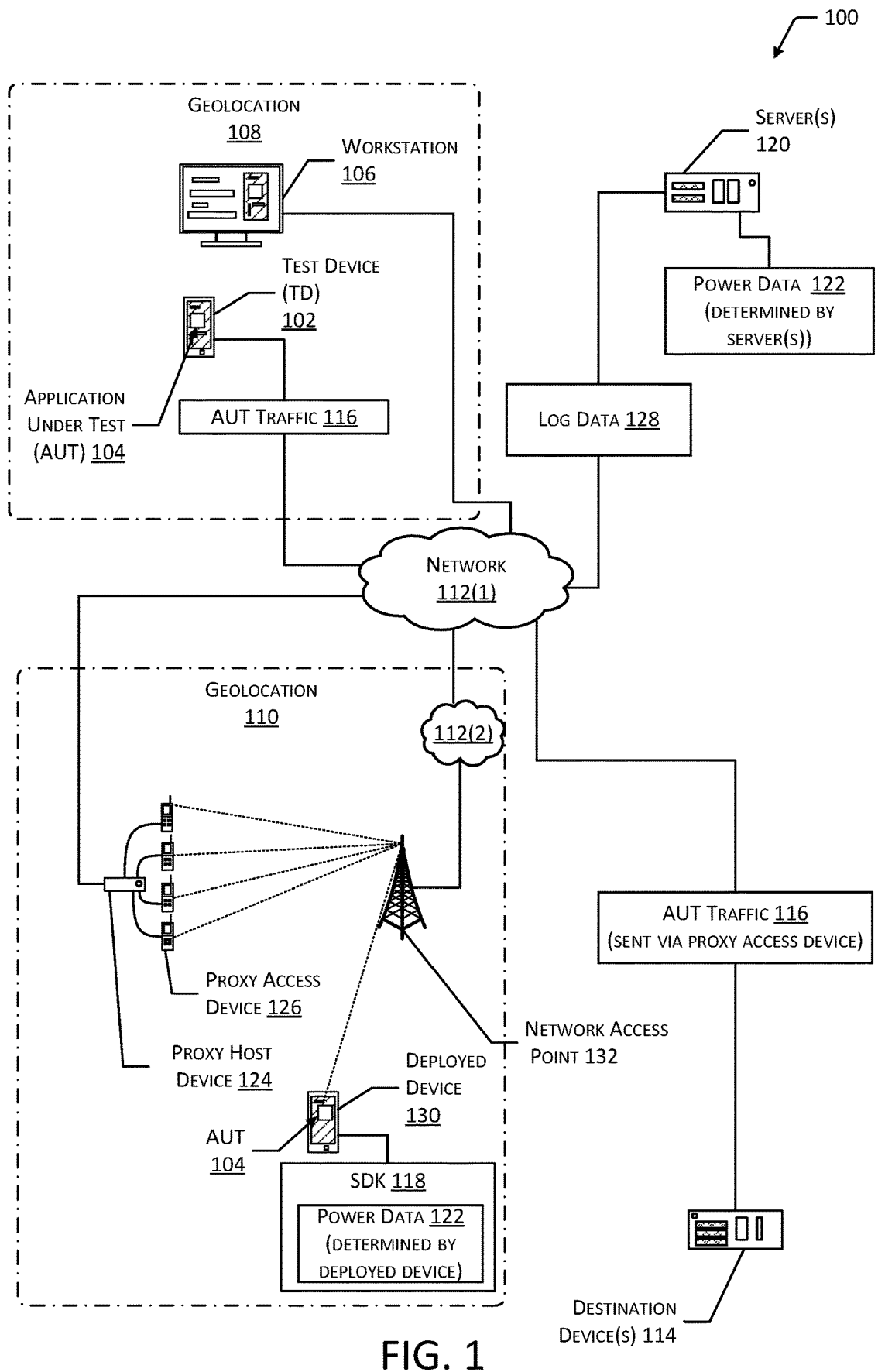
FIG. 1 depicts an implementation of a system for testing applications that utilize network resources, in which various metrics, including a quantity of power consumed by a test device while executing the application, may be determined.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A computing device may execute an application to provide various functions. Computing devices may include, for example, smartphones, laptops, tablet computers, desktop computers, servers, embedded devices, network-enabled devices, wearable computing devices, appliances, computing devices associated with vehicles, and so forth. Functions provided by an application may include, without limitation, retrieval or transmission of data, presentation of data using a display device, processing of data, and so forth.

The performance of an application may be evaluated based on various characteristics, such as video quality, an amount of content that is presented, a frame rate, an amount of data that is transferred, memory use, processor use, and so forth. One method by which the performance of an application may be evaluated may include determining a quantity of power discharged from a battery or other power source to perform one or more functions associated with the application. For example, certain functions of an application may consume large quantities of power, and the amount of power that is consumed may be affected by characteristics of the network at the time the functions are performed, characteristics of the devices that perform the functions, and so forth. Determining the functions, devices, and network conditions associated with periods of high power consumption may assist a developer in improving the performance of an application.

However, the amount of power consumed by a device during a particular period of time may be affected by a large number of factors, some of which may be specific to a particular device, some of which may be attributed to network conditions, some of which may be associated with performance of functions by an application, and some of which may be associated with performance of functions unrelated to the application. The large number of factors that may possibly affect power consumption may increase the difficulty associated with identifying suboptimal performance of an application and improving the performance of the application.

Described in this disclosure are techniques for determining the quantity of power used by various devices when performing particular functions associated with the application. The amount of power that is consumed may be shown in an output that presents power use over time, in association with the specific characteristics of the functions being performed, network conditions, device components that are utilized, and so forth. As a result, periods of high power consumption, or other periods where power consumption deviates from an expected value, may be determined, and possible factors that may have affected the amount of power that was consumed may be identified. The quantity of power used to perform a function or set of functions may be determined across multiple devices, which may increase the accuracy of the determined information and may enable power consumption that is attributable to specific device types or device components to be identified. Additionally, the quantity of power used to perform the function(s) may be determined at different times and under different network conditions, increasing the accuracy of the determined information and enabling power consumption attributable to specific networks or network conditions to be identified. Furthermore, in some implementations, the quantity of power used by a device may be determined using multiple methods, increasing the accuracy of the determined information and enabling power consumption to be determined for a larger number of devices by using a particular method when other methods of determining power use are not possible.

For example, a test device that is executing an application may be engaged with a host device that determines data regarding performance of the application. The host device may provide power to the battery or other power source of the test device to maintain a charge level of the battery. In one implementation, when the test device performs particular functions, the host device may cease providing power to the battery, and one or more of the host device or the test device may determine the state of the battery at one or more times before, during, or after performance of the function(s). In some cases, the charge level of the battery may be determined to exceed a threshold charge level before causing the test device to perform the function(s). Differences between the state of the battery may be used to determine a quantity of power used to perform the function(s). In another implementation, the host device may continue to provide power to the test device while the test device performs the function(s), and differences in the amount of power used to maintain the charge level of the battery may be used to determine a quantity of power used to perform the function(s). One or more of the host device or the test device may measure the amount of power transferred from the host device to the test device. In yet another implementation, the test device may determine a quantity of power discharged from the battery at one or more times before, during, or after performance of the function(s). Differences between the amount of power discharged before performing the function(s) (e.g., a baseline level of power consumption) and the amounts of power discharged during performance of the function may be used to determine a quantity of power used to perform the function(s). In some implementations, the test device may be placed in a simulated disconnect state to cause the test device to measure an amount of power that is consumed, while the host device may continue to provide power to maintain a charge level of the battery. In other implementations, a test device may perform one or more functions without engaging the test device to a host device, and information regarding quantities of power consumed by the test device may be determined by the test device and stored or transmitted to another device, or determined by another device in networked communication with the test device.

In some implementations, the output may present the quantity of power used to perform the function(s) as a value based on a portion of a total capacity of a power source, such as a percentage of the capacity of a battery. In other implementations, the quantity of power that was consumed may be presented independent of the characteristics of the power source, such as a measurement of battery energy drain in joules. In still other implementations, both a relative value, such as a percentage, and an absolute value, such as a quantity of joules, may be presented. In some cases, a measurement of battery current may also be presented. For example, the output may include multiple line graphs that represent a battery current, a battery energy drain measured in joules, and a battery energy drain percentage over time. At points where the quantity of power that was consumed exceeds a threshold value, the output may include indications of one or more network conditions or one or more characteristics of the function that was performed. For example, the output may also indicate characteristics such as memory or processor utilization of the test device, an amount of data transferred to or from the test device, a number of network connections, calls, or scans performed by the test device, use of various device components such as a Wi-Fi radio, and so forth. The output may therefore be used to determine components of the test device, characteristics of the function, or conditions of the network that may have contributed to a quantity of power that was consumed at a particular time.

In some implementations, a quantity of power used by a first device may differ from a quantity of power used by a second device by more than a threshold value. For example, an application may cause devices having particular components, characteristics, or configurations to consume a greater quantity of power than other devices. In response to such a determination, the output may include an indication of the characteristics of one or more of the devices in association with an indication of the quantity of power that was consumed.

Implementations described herein may therefore enable quantities of power consumption associated with different portions of an application or other type of function(s) to be determined, and the application characteristics, network characteristics, or device characteristics that may contribute to the quantities of power consumption to be identified. Use of multiple different methods for determining quantities of power consumption may increase the accuracy of the techniques described herein, while also enabling use of alternate methods when a particular method is not usable to determine a quantity of power consumed by a particular device.

FIG. 1 depicts an implementation of a system 100 for testing applications that utilize network resources, in which various metrics, including a quantity of power consumed by a test device (TD) 102 while executing the application, may be determined. An application under test (AUT) 104 may be executed on one or more different types of computing devices, such as a TD 102, a workstation 106, and so forth. Test devices 102 and workstations 106 may include any type of computing device including, without limitation, portable computing devices such as smartphones, laptops, or tablet computers, wearable computing devices, embedded devices, personal computing devices such as desktop computers, computing devices associated with vehicles, servers, computing devices associated with appliances or media devices, and so forth. The AUT 104 may perform any number and any type of functions including, without limitation, retrieval or transmission of data, presentation of data using an output device such as a display device or audio device, processing of data, and so forth. The AUT 104 may be an application that is at any stage in a development or maintenance lifecycle. For example, the AUT 104 may include software that has not yet been released (e.g., an alpha, prerelease, or pre-launch version), or may include a previously released version that is undergoing testing. In some implementations, the workstation 106, the TD 102, or one or more computing devices in communication with the workstation 106 or TD 102 may include an integrated development environment (IDE) to facilitate the creation and editing of program code, debugging, compiling, and so forth.

In some implementations, the workstation 106, TD 102, or other computing device(s) may include an emulator or simulator that is designed to execute the AUT 104 as though the AUT 104 were executing on another piece of hardware, using a different operating system, and so forth. For example, the TD 102 or workstation 106 on which the AUT 104 is executed may be located at a first geolocation 108, which may be geographically separate from a second geolocation 110. The first geolocation 108 and second geolocation 110 may include any type of geographic location, such as a particular room, building, city, state, country, and so forth. For example, a geographic location may be specified by a set of coordinates with regard to latitude and longitude on the surface of the Earth.

One or more of the TD 102 or workstation 106 may be connected to a first network 112(1). The first network 112(1) may, in turn, be connected to or be part of a larger network 112. For example, the first network 112(1) may comprise the Internet, or the first network 112(1) may be in communication with the Internet. The connection used by the TD 102 or workstation 106 may include, without limitation, a wired Ethernet connection, a wireless local area network (WLAN) connection such as Wi-Fi, and so forth. For example, the first geolocation 108 may include an office, and the TD 102 may connect to a local Wi-Fi access point that is connected via an Ethernet cable to a router. The router, in turn, may be connected to a cable modem that provides connectivity to the Internet. During operation, the AUT 104 may access one or more external resources. For example, external resources may be stored in association with one or more destination devices 114. The destination device(s) 114 may include any number and any type of computing devices including, without limitation, the types of computing devices described with regard to the TD 102 or workstation 106.

The AUT 104 may access, generate, transmit, or receive data. For example, the AUT 104 may cause AUT traffic 116 to be exchanged with one or more destination devices 114 during operation. Traditionally, the AUT traffic 116 associated with the TD 102 at the first geolocation 108 would be sent to the first network 112(1), and then to the destination device(s) 114. However, this traditional situation may only enable test data to be generated based on the conditions associated with the first geolocation 108 and first network 112(1). For example, a quantity of power used by a TD 102 to perform one or more functions associated with the AUT 104 may differ under other conditions associated with the second geolocation 110 or with other networks 112. However, this information may not be discoverable using test data that is associated only with the first geolocation 108 and first network 112(1).

To enable the AUT 104 to be tested under conditions associated with different locations, such as the second geolocation 110, and different networks 112, a software development kit (SDK) 118 may be incorporated into the AUT 104. In other implementations, techniques other than an SDK 118 may be used to provide the functionality described herein. For example, lines of computer code that provide the functionality of at least a portion of the SDK 118 may be incorporated into the code base of the AUT 104. The SDK 118 may provide a user interface that allows for the redirection of the AUT traffic 116. For example, the SDK 118 may include instructions to establish communication with one or more servers 120 or other computing devices, which may include modules for coordinating the activities of devices and analyzing data determined from the devices. Continuing the example, the server(s) 120 may determine power data 122 indicative of quantities of power used to perform functions associated with the AUT 104. Other types of data associated with the AUT 104 may include data relating to video quality or other video characteristics, data indicative of network conditions, data indicative of the particular functions performed by a device or components of the device that are used while executing the AUT 104, and so forth.

In other implementations, an SDK 118 may be used to determine data associated with functions performed by the AUT 104 without requiring transmission of the data to other devices. For example, a TD 102, workstation 106, or other device executing an AUT 104 may determine power data 122 indicative of quantities of power used to perform functions associated with the AUT 104 without transmitting data to the server(s) 120. In other cases, the SDK 118 executing on the TD 102, workstation 106, or other device may determine the power data 122.

In cases where data is sent to a server 120, the server 120 may coordinate the activities of one or more proxy host devices 124 or proxy access devices 126. A proxy host device 124 may connect to the first network 112(1) and to one or more of the proxy access devices 126. In one implementation, the proxy host device 124 may include a server, desktop computer, tablet, or other type of computing device to which multiple proxy access devices 126 are connected using a wired connection, such as a cable connecting each proxy access device 126 to a USB port of the proxy host device 124. While FIG. 1 depicts a single proxy host device 124 and four proxy access devices 126, any number of proxy host devices 124 and proxy access devices 126 may be used. For example, proxy host devices 124 and proxy access devices 126 may be placed in an enclosure having from one to three trays, slots, or other types of compartments, each of which may store a proxy host device 124 and one or more proxy access devices 126. Continuing the example, an enclosure may contain three proxy host devices 124 and twenty-four proxy access devices 126, with eight proxy access devices 126 communicating with each proxy host device 124.

The proxy access devices 126 may connect to a network access point 132 that provides connectivity to a second network 112(2). Use of the proxy access devices 126 to perform functions associated with an AUT 104 may therefore enable data regarding performance of the functions to be determined when different types of devices are used, and when a second network 112(2) having different characteristics than the first network 112(1) is used. For example, the proxy access devices 126 may include commodity cellphones, the network access points 132 may include cell phone towers, and the second network 112(2) may include a WWAN, such as a wireless cellular data network (WCDN). The second network 112(2) may in turn communicate with the first network 112(1). For example, a WCDN operated by a telecommunication company may interconnect or have a peering agreement with an Internet backbone provider. As a result, a user of the second network 112(2) may be able to access resources on the first network 112(1), and vice versa. In some implementations, the proxy access devices 126 may be capable of communication with the destination device(s) 114 or other devices using the second network 112(2) or another network 112, such as a cellular network, without communicating using the first network 112(1).

The proxy access devices 126 may be located at the second geolocation 110, which may be geographically removed from the first geolocation 108 where the TD 102 is located. For example, the proxy access devices 126 may be located in another city, state, country, and so forth that differs from the location of the TD 102. As part of the testing process for the AUT 104, a user interface may be presented to enable a user at the first geolocation 108 to select one or more of a particular geolocation, such as the second geolocation 110, or particular proxy access device 126 to use during testing. The server(s) 120 may maintain information about the proxy access devices 126, such as geolocation 110, availability, cost, characteristics of the proxy access device 126, and so forth. The server(s) 120 may coordinate establishment of a connection between the AUT 104 and the proxy access device 126 that was selected.

During testing, the AUT traffic 116 may be routed through the first network 112(1) to the proxy host device 124, then through the proxy access device 126 to the second network 112(2), and then on to the first network 112(1) to ultimately arrive at the destination device 114. The AUT traffic 116 may include outbound application traffic sent from the AUT 104 to the destination device 114 and inbound application traffic sent from the destination device 114 to the AUT 104. In some cases, at least a portion of the AUT traffic 116 may include power data 122 or other data regarding power consumption by one or more devices.

During operation, the AUT 104 may direct outbound application traffic to the proxy host device 124, which transfers the outbound application traffic to the proxy access device 126, which then sends the outbound application traffic to the second network 112(2). The second network 112(2) may send the outbound application traffic to the destination device 114. Inbound application traffic from the destination device 114 may follow the reverse path. The server(s) 120, or one or more other devices, such as devices executing the SDK 118, may collect log data 128 associated with operation of the system 110, such as information associated with operation of the proxy access device 126, packet capture of data transferred by the proxy host device 124, and so forth. Log data 128 may also indicate, for a particular instant in time, one or more of: a current page on a website, type of network that the proxy access device 126 is connected to, quantity of data received, quantity of data transmitted, latency to the destination device 114, data throughput, received signal strength, transmit power, cost associated with data transfer on the second network 112(2), and so forth. Log data 128 collected by the server(s) 120 may also include power data 122 or may be used to determine power data 122. The data collected by the server(s) 120 may therefore represent the AUT 104 operating on a real-world second network 112(2) at a desired geolocation, such as the second geolocation 110. The log data 128 or other data indicative of operation of the AUT 104 may include an output indicative of the quantity of power used to perform one or more functions associated with the AUT 104, or may be used to generate such an output.

In some implementations, instead of, or in addition to data determined by the server(s) 120, one or more deployed devices 130 may provide log data 128 to the server(s) 120. Deployed devices 130 may include, but are not limited to, any of the types of computing devices described with regard to the TD 102. For example, a deployed device 130 may execute the AUT 104 and generate AUT traffic 116, log data 128, and so forth. In some implementations, the deployed device 130 may also incorporate the SDK 118. For example, the SDK 118 may determine power data 122 based on execution of the AUT 104 by the deployed device 130.

Data determined by operation of the test device 102, workstation 106, proxy access devices 126, and deployed devices 130 may be used to generate reports, determine modifications to the AUT 104, and so forth. In some cases, while the AUT 104 is executing on the proxy access devices 126, one or more of the proxy access devices 126 or the proxy host devices 124 may display or store proprietary information. For example, it may be desirable to prevent individuals located at the second geolocation 110 from viewing displays associated with the proxy access devices 126, accessing data stored on the proxy access devices 126 or proxy host devices 124, or tampering with the devices themselves. As such, in some implementations, the proxy host devices 124 and proxy access devices 126 may be maintained in a secure enclosure that is configured to limit access to the devices, and in the event of an unauthorized access, cause one or more devices to be locked, deactivated, or delete data from the devices. Privacy of data associated with an AUT 104 may be preserved by transmitting the data to a device maintained in a secure enclosure. In other cases, a secure test device 102, workstation 106, or deployed device 130 may preserve the privacy of the data. For example, an SDK 118 that is incorporated within a device may be used to determine power data 122 and other data regarding execution of an AUT 104 without providing access to the data associated with the AUT 104 to other devices.

Figure 2:
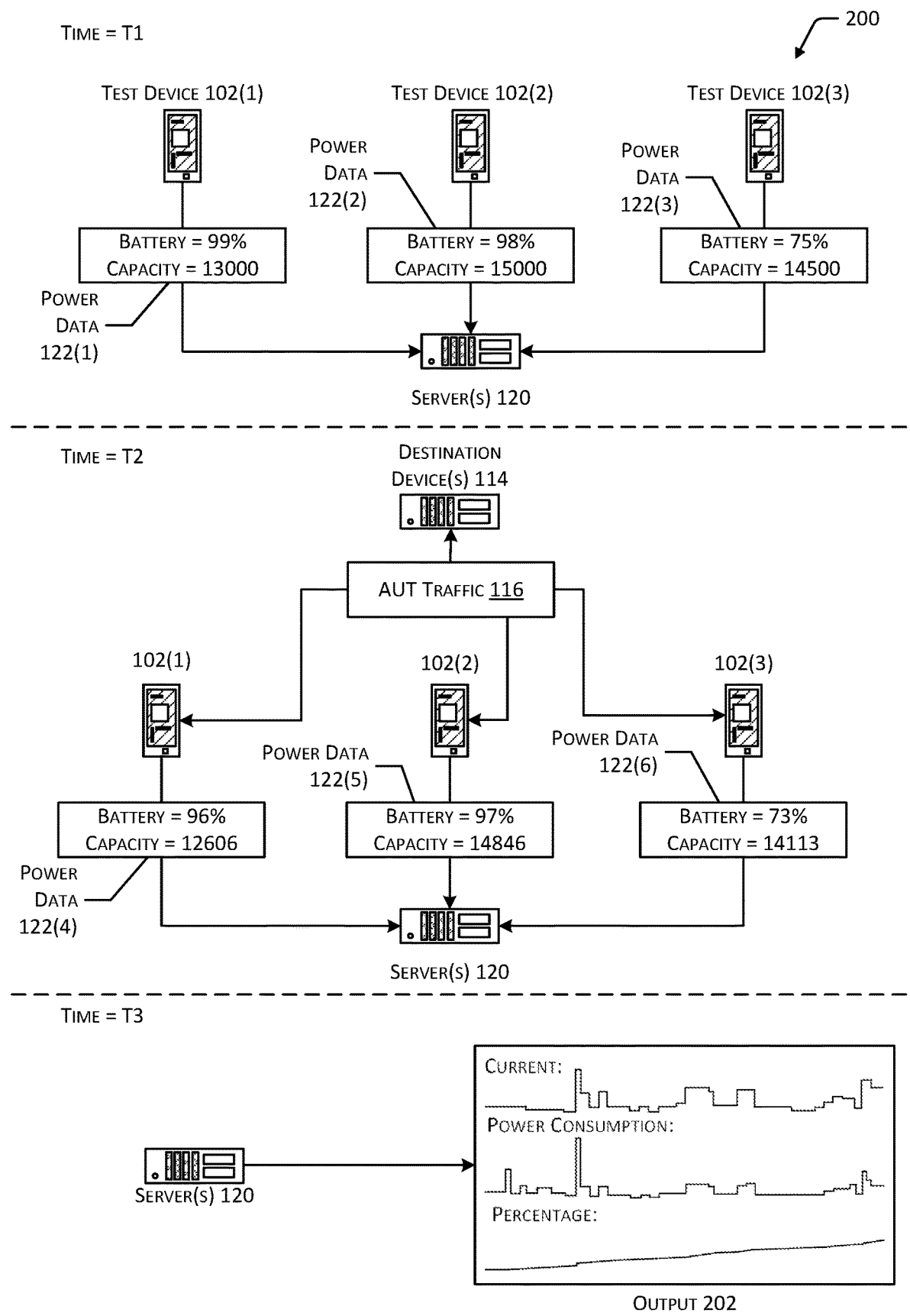
FIG. 2 depicts an implementation of a system for generating an output based on the quantities of power consumed by test devices that are executing an application.

FIG. 2 depicts an implementation of a system 200 for generating an output 202 based on the quantities of power consumed by test devices 102 that are executing an application. Each test device 102 may include a computing device, such as a smartphone, commodity cell phone, or other type of computing device, having a processor, data storage, communication components, and other components that may execute an application under test 104, communicate with other computing devices such as servers 120, destination devices 114, and so forth. Each test device 102 may also include a power source, such as a battery. FIG. 2 depicts a first test device 102(1), a second test device 102(2), and a third test device 102(3). However, in other implementations, any number of test devices 102 may be used. Additionally, while FIG. 2 depicts each test device 102 as a similar type of device, in other implementations, the test devices 102 may include different types of devices having different components, different types of power sources, and so forth.

At a first time T1, prior to performing one or more functions associated with the application under test 104, the server(s) 120 may determine a state associated with the power source of the test device(s) 102. Specifically, FIG. 1 depicts the first test device 102(1) providing first power data 122(1) to the server(s) 120, the second test device 102(2) providing second power data 122(2), and the third test device 102(3) providing third power data 122(3). The power data 122 for each test device 102 may indicate a quantity of power associated with the power source of the test device 102. In some implementations, the quantity of power may include an absolute quantity, such as a measurement of battery capacity in millijoules (mJ) or other units. In other implementations, the quantity of power may include a relative quantity based on the total capacity of the power source, such as a measurement of battery capacity expressed as a remaining percentage of total battery capacity. In some implementations, the power data 122 may also include an indication of a current that is being drawn from the power source. In some implementations, the power data 122 for a test device 102 may be determined by the test device 102 and provided to the server(s) 120. In other implementations, the power data 122 may be determined by the server(s) 120 based on information acquired from a test device 102. In still other implementations, another computing device in communication with a test device 102 may determine the power data 122 and provide the power data 122 to the server(s) 120.

At a second time T2, one or more of the test devices 102 may perform one or more functions associated with the application under test 104. For example, the first test device 102(1), second test device 102(2), and third test device 102(3) are each shown exchanging AUT traffic 116 with one or more destination devices 114. As described with regard to FIG. 1, AUT traffic 116 may be accessed by the test devices 102, generated by the test devices 102, received by the test devices 102, processed by the test devices 102, and so forth. While FIG. 2 depicts the first test device 102(1), second test device 102(2), and third test device 102(3) each performing one or more functions at the second time T2, in other implementations, different test devices 102 may perform different functions at different times, and power data 122 indicative of the power consumed by each test device 102 to perform the function(s) may be determined at any time during or after performance of the function(s).

Specifically, FIG. 2 depicts the server(s) 120 determining fourth power data 122(4) associated with the first test device 102(1), fifth power data 122(5) associated with the second test device 102(2), and sixth power data 122(6) associated with the third test device 102(3). Differences between the first power data 122(1) and the fourth power data 122(4) may be used to determine an amount of power consumed by the first test device 102(1) when performing the functions associated with the application under test 104. In some implementations, the first power data 122(1) may indicate a quantity of power stored in a battery of the first test device 102(1) prior to performing the function(s), while the fourth power data 122(4) may indicate a quantity of power that remains in the battery of the first test device 102(1) during or after performance of the function(s). For example, a difference between the first quantity of power and the second quantity of power may indicate a quantity of power consumed by the first test device 102(1) to perform the function(s). In other implementations, the first power data 122(1) may indicate a first quantity of power that is being provided to the battery of the first test device 102(1) to maintain a charge level of the battery, while the fourth power data 122(4) indicates a second quantity of power that is provided to the battery to maintain the charge level during or after performance of the functions(s). For example, the first test device 102(1) may be engaged with another device that is charging the battery of the first test device 102(1), and during or after performance of the function(s), a greater quantity of power may be required from the charging device to maintain the charge level of the battery of the first test device 102(1). A difference between the first quantity of power and the second quantity of power may indicate a quantity of power consumed by the first test device 102(1) to perform the function(s). In still other implementations, the first power data 122(1) may indicate a first quantity of power that is being discharged from the battery of the first test device 102(1) prior to performance of the function(s), while the fourth power data 122(4) indicates a second quantity of power that is discharged from the battery during or after performance of the function(s). For example, the first quantity of power may include a baseline power consumption of the first test device 102(1) when the first test device 102(1) is not performing the function(s), while the second quantity of power may be a greater quantity of power that is consumed during or after performance of the function(s). In such a case, a difference between the first quantity of power and the second quantity of power may indicate a quantity of power consumed by the first test device 102(1) to perform the function(s).

At a third time T3, the sever(s) 120, or another computing device, may determine an output 202 based on the power data 122. For example, FIG. 2 depicts the output as a series of graphs that associate a battery current ("Current"), an amount of power consumed ("Power Consumption"), and a portion of a battery capacity consumed ("Percentage") over-time. In some implementations, at least a portion of the output 202 may be determined based on power data 122 from multiple test devices 102. For example, a quantity of power consumed to perform a particular set of functions may be determined from multiple test devices 102, and the output 202 may present an average quantity of power that was consumed. In other implementations, separate outputs 202 for particular test devices 102 or sets of test devices 102 may be determined.

In some implementations, the output 202 may associate one or more portions that are indicative of high or low power consumption with an indication of characteristics of the application under test 104, such as the particular functions that were performed, particular components of the test device(s) 102 that were used, and so forth. In some implementations, the output 202 may associate one or more portions that are indicative of high or low power consumption with an indication of characteristics or conditions of the network(s) 112 that are used to exchange AUT traffic 116 and access other data or resources. For example, the output 202 may also include one or more graphs that indicate a quantity of transferred data, a quantity of network connections, characteristics of a display output, and so forth over time. In such a case, portions of the output 202 that indicate high or low power consumption may be viewed alongside corresponding portions of the output 202 that indicate device characteristics, application characteristics, or network characteristics. In other implementations, portions of the output 202 that indicate high or low power consumption may be associated with labels or other indications that provide information regarding device characteristics, application characteristics, or network characteristics that may have contributed to the high or low power use. For example, in response to an average power consumption that is greater than a threshold value, the output 202 may be provided with a label indicative of one or more device characteristics, application characteristics, or network characteristics at a location proximate to the portion of the output 202 that indicates high power consumption.

Figure 3:
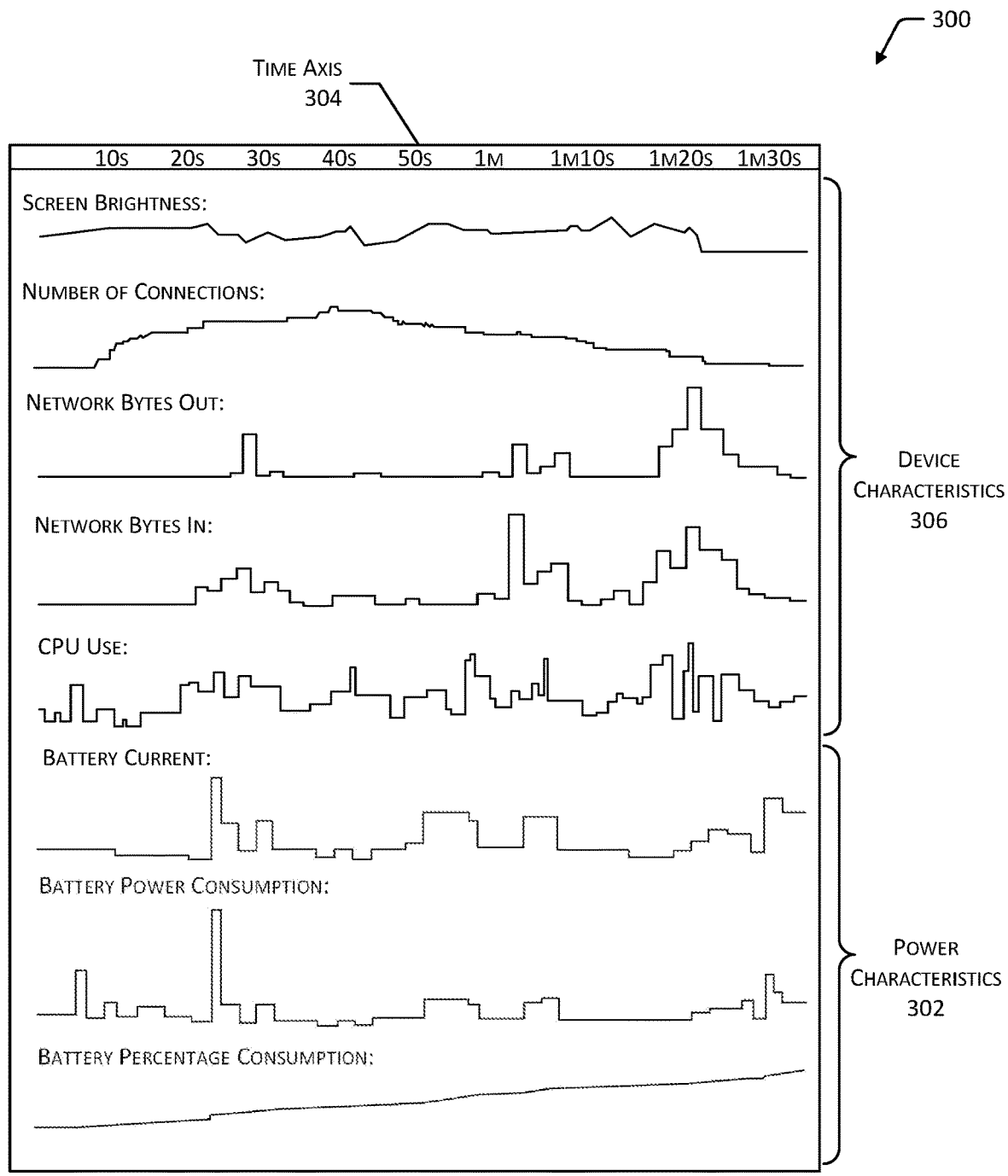
FIG. 3 is a diagram depicting an implementation of an output that may present information regarding quantities of power that are consumed over time as functions associated with an application are performed.

FIG. 3 is a diagram 300 depicting an implementation of an output 202 that may present information regarding quantities of power that are consumed over time as functions associated with an application are performed. For example, the output 202 may associate power characteristics 302 indicative of the states of one or more power sources of one or more test devices 102 with the times at which the states are determined, indicated by a time axis 304. In some implementations, the output 202 may also include indications of one or more device characteristics 306, which may indicate components of test devices 102 that are used, such as processors, memory, displays, radios or other communication components, and so forth. In other implementations, the output 202 may also include characteristics of an application under test 104, such as functions that are being performed, or characteristics of a network 112, such as a quantity of traffic, latency, and so forth. In some cases, one or more of the device characteristics 306 may also be indicative of a characteristic of an application under test 104 or a characteristic of a network 112. For example, a device characteristic 306 such as the brightness of a display may also be indicative of characteristics of a video output associated with the application under test 104. As another example, a device characteristic 306 associated with a quantity of data transmitted using a Wi-Fi radio may also be indicative of a quantity of traffic transmitted using one or more networks 112.

As described with regard to FIGS. 1 and 2, the power characteristics 302 of the output 202 may be determined based on power data 122 from one or more test devices 102. For example, power data 122 may include the state of a battery or other type of power source, determined at one or more times, such as before, during, or after performance of one or more functions associated with an application under test 104. The output 202 may include one or more values, graphs, or other visual representations of quantities of power consumed by test devices 102 at different times. For example, FIG. 3 depicts the power characteristics 302 including a graph indicating an average quantity of consumed power ("Battery Power Consumption") at different times while performing functions associated with an application under test 104. The power characteristics 302 may also include a graph representing an average portion of the total capacity of a power source ("Battery Percentage Consumption"). Additionally, in some implementations, the power characteristics 320 may include a graph representing an average current drawn from a power source ("Battery Current") while performing functions associated with an application under test 104.

Presentation of the power characteristics 302 in association with the device characteristics 306, and in some implementations characteristics of the application under test 104 or characteristics of the network(s) 112, may enable factors that contribute to high power consumption or low power consumption to be determined based on the output 202. For example, FIG. 3 depicts the device characteristics 306 indicating use of one or more components of the test device(s) 102, such as an indication of "Screen Brightness" that may represent brightness of a display output. In other implementations, one or more other characteristics of a video output such as values representing video quality, blurriness, blockiness, contrast, colorfulness, a downsampling index, a frame rate, or a degree of change in a display output may be presented in the output 302.

FIG. 3 also depicts the device characteristics 306 including a number of connections associated with the test device(s) 102 ("Number of Connections"), and quantities of data exchanged by the test device(s) 102 ("Network Bytes Out" and "Network Bytes In"). These device characteristics 306 may be indicative of use of components of test devices 102, such as communication radios or other communication components, a quantity of traffic transmitted using one or more networks 112, a quantity of Wi-Fi scans or other functions for establishing connections, and so forth. Quantities of transferred data may include values measured in bytes, packets, or other units. Additionally, in other implementations, device characteristics 306 may include an indication of a download speed, HTTP throughput, and so forth. In some implementations, the output 202 may also indicate total quantities of data transmitted using one or more networks 112 during a time period.

FIG. 3 additionally depicts the device characteristics 306 including a graph representing processor utilization ("CPU Use") of the test device(s) 102. For example, times at which high processor utilization occurs may correspond to times where high power consumption occurs. Processor utilization may be indicated as an absolute value (e.g., a number of processor cycles), or a relative value (e.g., a percentage of a maximum or threshold processor utilization value). In other implementations, device characteristics 306 may include a value representing a single thread processor utilization, an absolute or relative indication of memory used by one or more test devices, and so forth.

In some implementations, the output 202 may also include an indication of one or more regions where an issue relating to one or more functions associated with the application under test 104 occurred. For example, the output 202 may include a graph or other type of indicator indicating the presence of a region associated with high power consumption. In some implementations, selection of such an indicator via user input may enable additional information regarding the factor(s) that may have contributed to the high power consumption to be displayed. In other implementations, selection of other indications presented in the output 202 may enable additional information to be displayed. For example, selecting a portion of the graph indicating "Battery Power Consumption" may cause a value corresponding to the selected point of the graph to be displayed. In other implementations, selecting a portion of the graph indicating "Battery Power Consumption" that corresponds to high power consumption may cause information relating to device characteristics 306, application characteristics, or network characteristics that may have contributed to the high power consumption to be displayed.

Figure 4:
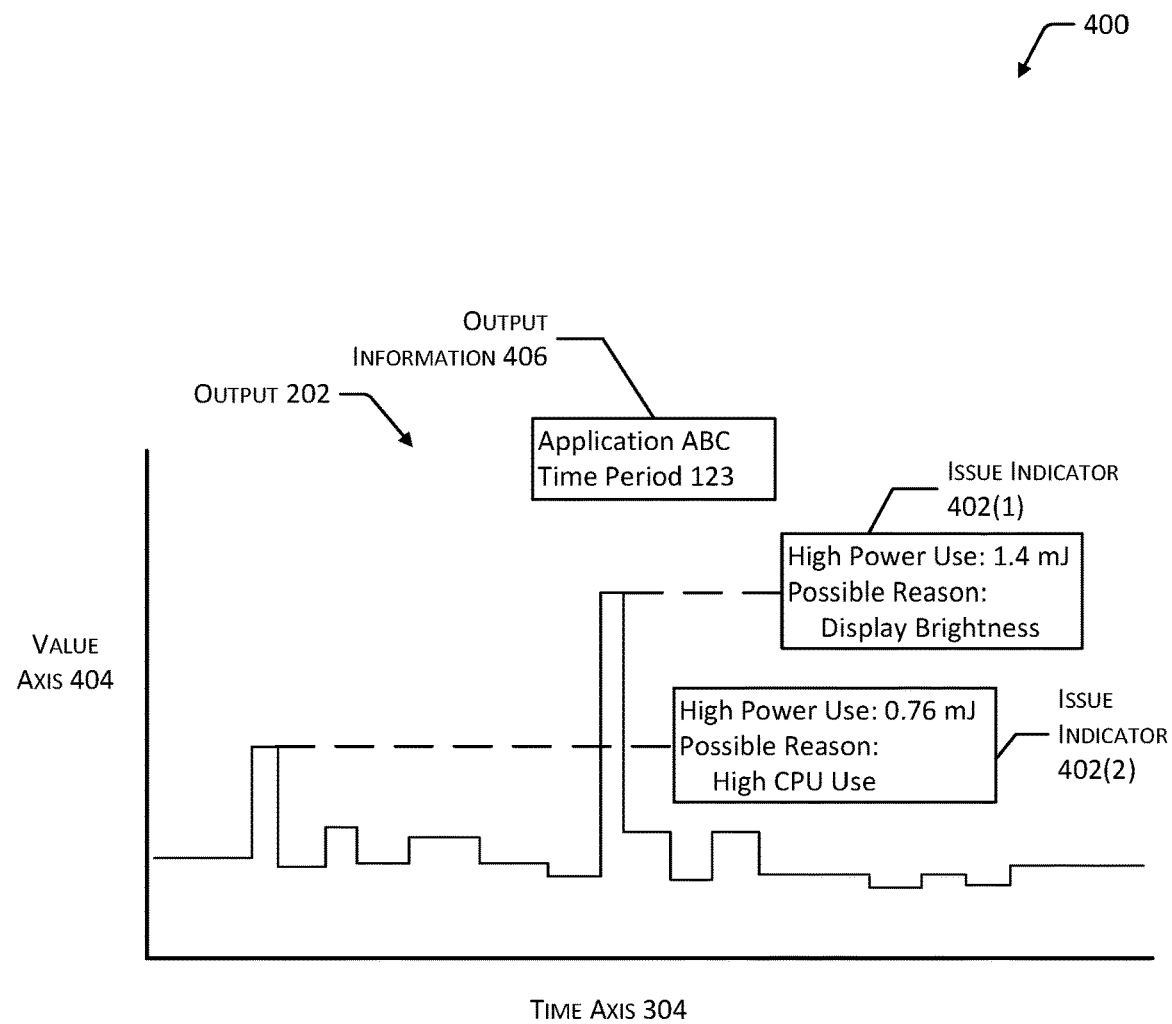
FIG. 4 is a diagram depicting an implementation of an example output that includes issue indicators that present device characteristics, network characteristics, or application characteristics that may have contributed to power consumption by test devices.

FIG. 4 is a diagram 400 depicting an implementation of an example output 202 that includes issue indicators 402 that present device characteristics 306, network characteristics, or application characteristics that may have contributed to power consumption by test devices 102. As described with regard to FIGS. 1-3, an output 202 indicative of one or more power characteristics 302 may be generated based on power data 122 determined from test devices 102. The power data 122 may represent the states of the power sources of the test device(s) 102 at various times, such as times before, during, or after performance of one or more functions associated with an application under test 104. For example, FIG. 4 depicts an output 202 that includes a graph in which a position of a line along a value axis 404 represents a quantity of power consumption by one or more test devices 202, while a position of the line along a time axis 304 represents a time associated with the quantity of power consumption.

The quantity of power consumption represented in the output 202 may be determined based on the states of multiple power sources of multiple test devices 102. For example, the output 202 may represent an average (e.g., mean) quantity of power consumption for a set of test devices 102 that perform the same or similar functions associated with an application under test 104. In some implementations, the output 202 may include output information 406, which may include an identifier associated with the application under test 104, one or more functions of the application, the test that was performed, or the output 202 itself. The output information 406 may also include an indication of a time period associated with the output 202. In some implementations, the output information 406 may include information indicative of one or more test devices 102 or networks 112 that were used.

The output 202 may also include one or more issue indicators 402. In some implementations, an issue indicator 402 may be generated or presented in response to a value for a quantity of power consumption that is greater than or less than a threshold value. In other implementations, an issue indicator 402 may be generated in response to user input selecting a portion of the output 202. In still other implementations, an issue indicator 402 may be generated for each segment of determined power data 122, such as power data 122 determined during a time period of ten seconds, stored, and presented in response to user input selecting a portion of the output 202. An issue indicator 402 may represent a time at which a particular device characteristic 306, network characteristic, or application characteristic may have caused a particular quantity of power consumption. For example, FIG. 4 depicts a first issue indicator 402(1) that indicates a "High Power Use" of 1.4 millijoules and an indication of a particular device characteristic 306 (e.g., "Display Brightness") that may have influenced the quantity of power consumption. FIG. 4 depicts a second issue indicator 402(2) that indicates a power consumption of "0.76 mJ) and a particular device characteristic 306 (e.g., "High CPU Use") that may have influenced the quantity of power consumption. An output 202 that associates quantities of power consumption with potential characteristics that may have influenced the power consumption may be used to improve operation of applications, determine appropriate networks 112 and devices for use, and so forth.

Figure 5:
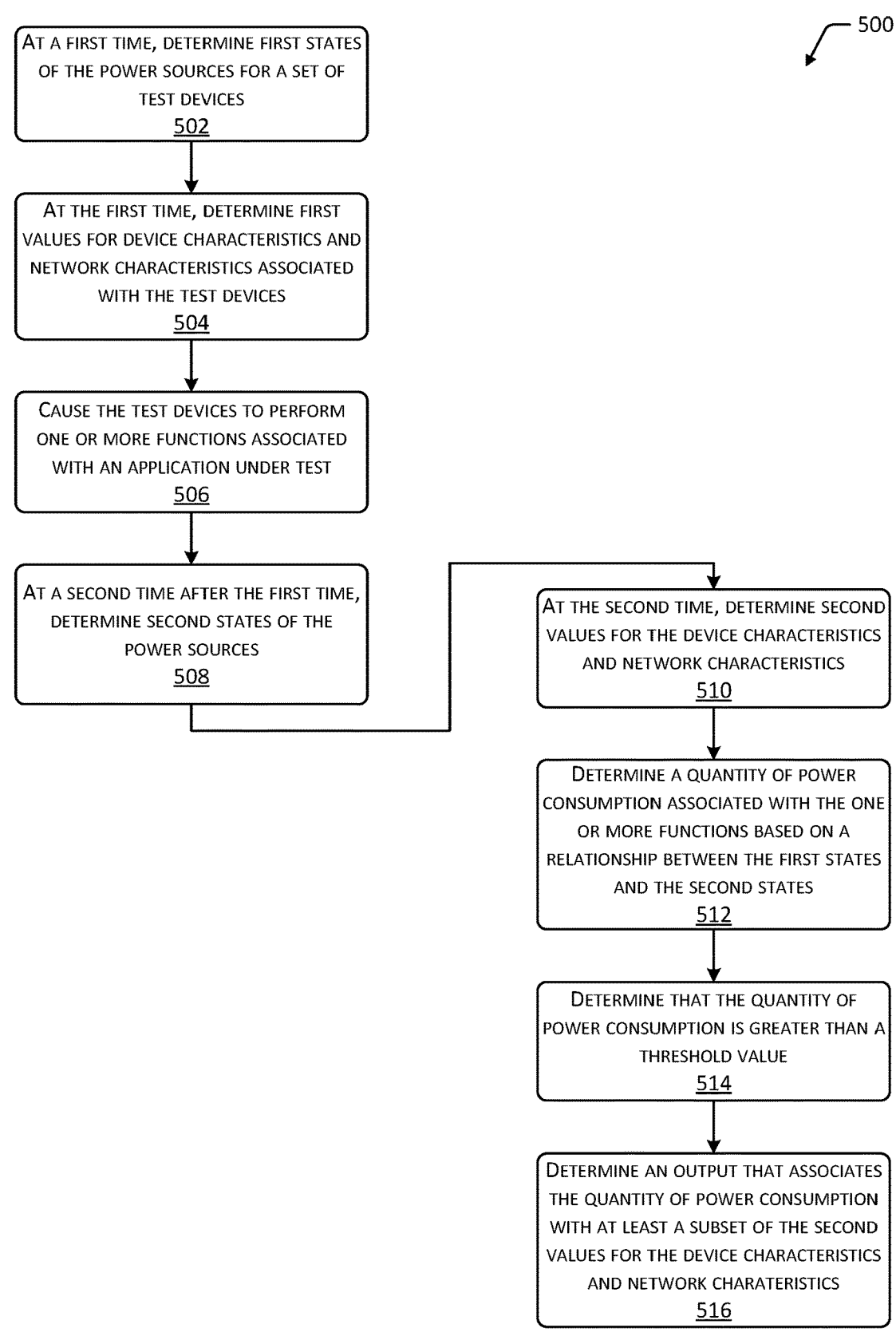
FIG. 5 is a flow diagram depicting an implementation of a method for determining quantities of power consumption associated with performance of one or more functions and determining an output based on the quantities of power consumption.

FIG. 5 is a flow diagram 500 depicting an implementation of a method for determining quantities of power consumption associated with performance of one or more functions and determining an output 202 based on the quantities of power consumption. At 502, at a first time, first states of the power sources for a set of test devices 102 may be determined. In some implementations, the first time may be a time before an application under test 104 is executed or before one or more functions associated with the application under test 104 are performed. In one implementation, determining the first state of a power source may include determining a quantity of stored power. For example, a test device 102 or another computing device in communication with the test device 102 may determine a charge level associated with a battery or other type of power source and may provide power data 122 indicative of the determined charge level. In another implementation, the first state of the power source may include a quantity of power that is used to maintain a charge level of the power source. For example, a test device 102 may be engaged with another computing device, a charging device, or a power source, which may provide power to the power source of the test device 102. Continuing the example, the amount of power provided to the power source of the test device 102 may maintain the charge level of the power source at a maximum level, or another selected charge level. In yet another implementation, the first state of the power source may include a quantity of power that is provided from the power source to one or more components of the test device 102. For example, the first state may represent a baseline quantity of power to maintain the test device 102 in a powered state or to maintain operation of one or more components of the test device 102. In some cases, a test device 102 may be engaged with a host device or another computing device at the first time, which may selectively provide power to the power source of the test device 102. In other cases, the test device 102 may be disengaged from other computing devices. For example, a test device 102 at a remote location may communicate with a server 120 or other computing device using one or more wireless networks 112.

At 504, at the first time, first values for device characteristics 306 and network characteristics associated with the test devices 102 may be determined. For example, before execution of an application under test 104 or before performance of one or more functions associated with the application under test 104, various characteristics of the test device 102, one or more networks 112 accessible to the test device 102, or the application under test 104 may be determined. Continuing the example, a value indicating particular components or a count of components of the test device 102 that are currently in use, or particular actions or a count of actions performed by the test device 102 may be determined. As described with regard to FIG. 3, example device characteristics 306 may include use of a display or other output device, characteristics of an output, a count of connections associated with the test device 102, quantities of data transmitted to or from the test device 102, processor use, memory use, and so forth.

At 506, the test devices 102 may be caused to perform one or more functions associated with an application under test 104. Functions may include execution of the application under test 104, access of data, receipt of data, generation of data, transmission of data, processing of data, output of data, and so forth. In some implementations, the test devices 102 may be caused to perform one or more functions based on user input. In other implementations, a test device 102 may be caused to perform a function based on a signal from another computing device that is engaged with or in remote communication with the test device 102. In still other implementations, the test device 102 may cause performance of the function(s) associated with the application under test 104. In some cases, a charge level of the power source of the test device 102 may be determined to be greater than a threshold charge level prior to causing the test device 102 to perform the function(s). For example, if a test device 102 is not engaged with a charging device, a charging device ceases providing power to the test device 102 during performance of the functions, or the functions may use a significant quantity of stored power, determining that the charge level is greater than the threshold charge level may prevent discharging the power source below a selected minimum charge level.

At 508, at a second time after the first time, second states of the power sources of the test devices 102 may be determined. In some implementations, the second time may occur during performance of one or more functions associated with an application under test 104, or after performance of the one or more functions. In one implementation, determining the second state for a power source may include determining a quantity of stored power. For example, a first quantity of stored power may be determined at the first time, while a second quantity of power may be determined at the second time. A difference between the first quantity and the second quantity may indicate an amount of power used to perform the function(s) associated with the application under test 104. In another implementation, the second state may include a quantity of power that is used to maintain a charge level of the power source. For example, at the first time, another computing device, charging device, or power source may provide a first quantity of power to a test device 102 to maintain a charge level of the power source of the test device 102. At the second time, during or after performance of the function(s) associated with the application under test 104, a second quantity of power may be provided to maintain the charge level. A difference between the first quantity and the second quantity may indicate a quantity of power used to perform the function(s). In another implementation, the second state may include a quantity of power that is provided from the power source of the test device 102 to one or more components of the test device 102 during or after performance of the function(s). For example, the first state may represent a baseline quantity of power to maintain the test device 102 in a powered state or to maintain operation of one or more components, while the second state may represent an increased quantity of power used to perform the function(s) in addition to maintaining operation of the component(s). A difference between the quantities of power associated with the first state and second state may indicate a quantity of power used to perform the function(s) associated with the application under test 104.

At 510, second values for the device characteristics 306 and network characteristics may be determined at the second time. For example, different quantities of processor or memory utilization, data transfer, video output, and so forth may occur during or after performance of functions associated with an application under test 104. The different counts and types of device components that are used or functions that are performed by the test device 102 may cause different quantities of power to be consumed.

At 512, a quantity of power consumption associated with one or more functions may be determined based on a relationship between the first states and the second states. As described previously, in some implementations, the relationship may include a difference between a first quantity of power associated with the first state and a second quantity of power associated with the second state. For example, a difference between a quantity of stored power associated with a battery before and after performance of a function may indicate the quantity of power used to perform the function. As another example, a difference between quantities of power expended from a power source or to maintain a charge level of the power source both before, and either during or after performance of a function may be used to determine the quantity of power used to perform the function. In some implementations, a test device 102 may be in a charging state, such as by engaging the test device 102 with another computing device or power source. In some cases, charging of the power source of the test device 102 may be ceased while the test device 102 is used to perform one or more functions, which may enable a quantity of power used by the test device 102 to be measured by determining the state of the power source after performance of the function(s). In other cases, the test device 102 may be placed in a simulated state of disconnect while charging of the power source of the test device 102 continues. In still other cases, the test device 102 may remain in a charging state, and quantities of power used by the test device 102 may be determined based on differences in quantities of power used to maintain a charge level of the power source before and after performance of the function(s).

At 514, a determination may be made that the quantity of power consumption is greater than a threshold value. For example, if a quantity of power consumption exceeds a threshold value, this may indicate that a particular function, set of functions, or portion of a function is associated with an irregularly high quantity of power consumption, which may indicate improper or suboptimal performance of a function or other portion of an application under test 104. As another example, a particularly low quantity of power consumption may indicate irregular performance of a function associated with the application under test 104.

At 516, an output 202 that associates the determined quantity of power consumption with at least a subset of the second values for the device characteristics 306 and network characteristics may be determined. For example, as described with regard to FIGS. 2 and 3, an output 202 may associate quantities of power consumption with particular times during execution of an application under test 104. The output 202 may also associate quantities of power consumption with values for one or more device characteristics 306, characteristics of the application under test 104, characteristics of one or more networks 112, and so forth. In some implementations, the quantity of power consumption included in the output 202 may include an average value determined using multiple test devices 202. In other implementations, the output 202 may be determined using only a subset of power data 122 received from a set of test devices 102. For example, if a quantity of power consumption for a particular test device 102 deviates from an average value associated with other test devices 102 by more than a threshold value, the quantity of power consumption for the particular test device 102 may be disregarded when determining an average value for inclusion in the output 202. In some implementations, if power data 122 determined from a particular test device 102, a particular type of test device 102, or test devices 102 having particular components or characteristics deviates from an average value, the output 202 may include an indication of the devices, device types, components, or characteristics that may contribute to a quantity of power consumption that deviates from the average value.

Figure 6:
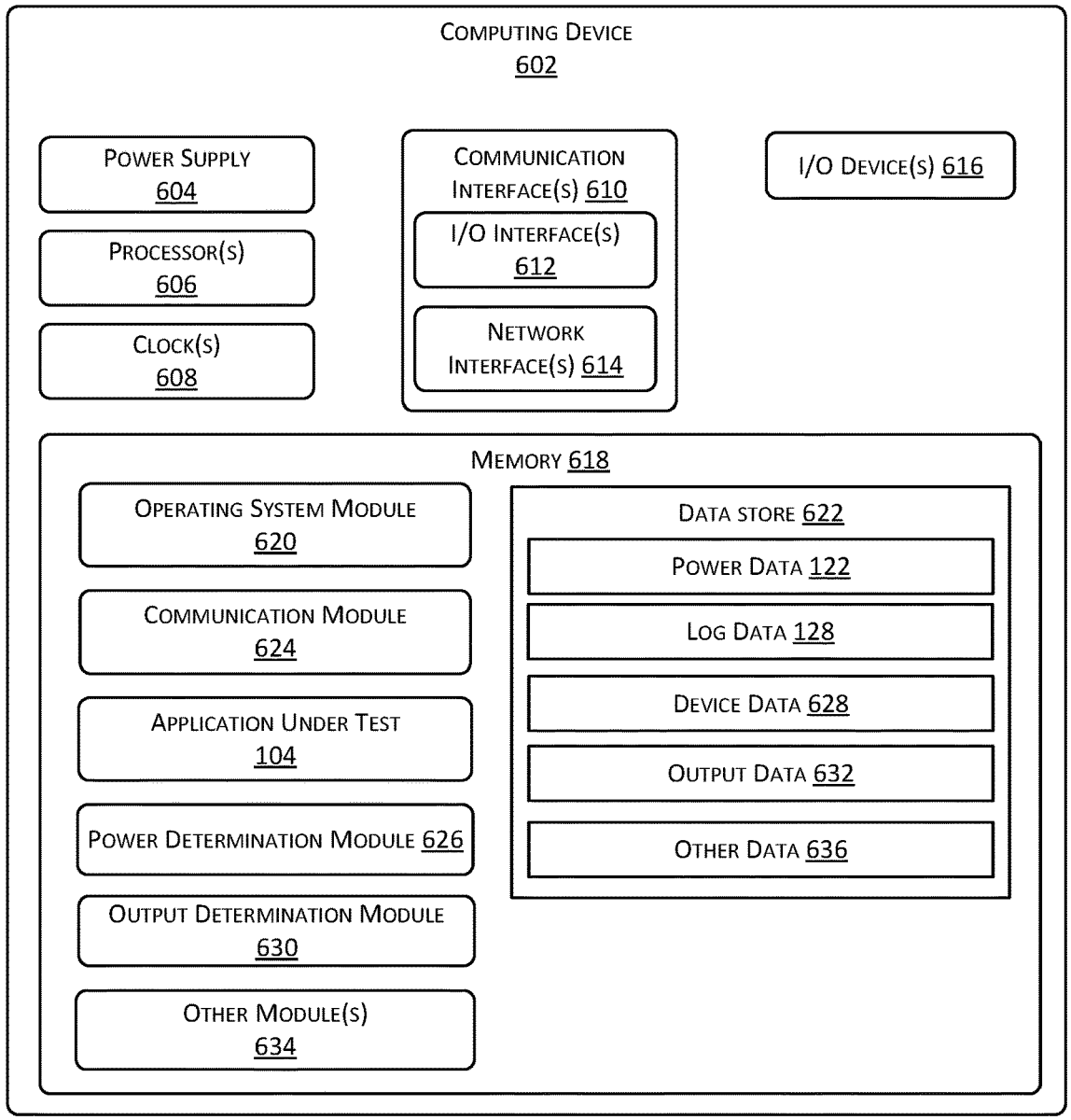
FIG. 6 is a block diagram depicting an implementation of a computing device within the present disclosure.

FIG. 6 is a block diagram 600 depicting an implementation of a computing device 602 within the present disclosure. The computing device 602 may include one or more servers 120, one or more test devices 102, one or more workstations 106, one or more proxy host devices 124, one or more proxy access devices 126, one or more deployed devices 130, or any other computing device 602 in communication with a test device 102 or other device executing an application under test 104. Additionally, while FIG. 6 depicts a single block diagram 600 of a computing device 602, any number and any type of computing devices 602 may be used to perform the functions described herein. For example, a portion of the functions described herein may be performed by one or more servers 120, while other functions may be performed by one or more test devices 102.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth. In some implementations the power supply 604 may be associated with components for determining a state of the power supply 604. A state of the power supply 604 may include quantities of power discharged from the power supply 604, quantities of power received by the power supply 604, whether the power supply 604 is in a state of charging or discharge, and so forth.

The computing device 602 may include one or more hardware processor(s) 606 (processors) configured to execute one or more stored instructions, such as applications under test 104, one or more modules to determine and analyze data from test devices 102, or one or more modules to generate outputs 202. The processor(s) 606 may include one or more cores. One or more clock(s) 608 may provide information indicative of date, time, ticks, and so forth. For example, the processor(s) 606 may use data from the clock 608 to generate a timestamp, trigger a preprogrammed action, include indications of times when particular values are measured in an output 202, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input devices or output devices associated with the computing device 602. For example, I/O devices 616 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 616 may be physically incorporated with the computing device 602. In other implementations, I/O devices 616 may be externally placed.

The network interfaces 614 may be configured to provide communications between the computing device 602 and other devices, such as the I/O devices 616, routers, access points, and so forth. The network interfaces 614 may include devices configured to couple to one or more networks 112 including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, 5G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC). In some implementations, the functionality described with regard to one or more of the modules may be incorporated within a software development kit (SDK) 118.

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store a power determination module 626. The power determination module 626 may generate power data 122 indicative of the state of one or more power sources associated with the computing device 602 or with other computing devices 602. The state of a power source may include a charge level or quantity of power stored in the power source, a quantity of power supplied to the power source at one or more times, a quantity of power discharged from the power source at one or more times, and so forth. In some implementations, log data 128 indicative of at least a portion of the power data 122 may also be generated. In some implementations, the power determination module 626 may access device data 628 indicative of particular test devices 102, power sources, and methods for accessing information associated with the test devices 102 for generation of power data 122. For example, the device data 628 may indicate whether a test device 102 includes components for measuring discharge from a power source, whether a test device 102 is in a charging or discharge state, a location of a test device 102, networks 112 accessible to a test device 102, and so forth.

The memory 618 may additionally store an output determination module 630. The output determination module 630 may generate one or more outputs 202 that associate quantities of power, determined based on the power data 122, with other characteristics of an application under test 104, test device 102, or network 112. In some implementations, the output determination module 630 may determine one or more device characteristics 306 based on the device data 628. Additionally, in some implementations, the output determination module 630 may access output data 632 which may indicate a format or arrangement of information within an output 202, as well as one or more rules or threshold values that may control the particular information included in the output 202. For example, the output data 632 may indicate a threshold value associated with high power use and a rule that causes information regarding particular device characteristics 306 to be presented in response to a quantity of power consumption exceeding the threshold value.

Other modules 634 may also be present in the memory 618. For example, other modules 634 may include user interface modules for generating user interfaces for controlling portions of a test process for an application under test 104. Other modules 634 may include logging modules for determining log data 128 based on characteristics of one or more computing devices 602 during performance of functions associated with an application under test 104. Other modules 634 may also include encryption modules to encrypt and decrypt communications between computing devices 602, authentication modules to authenticate communications sent or received by computing devices 602, a permission module to assign, determine, and manage user permissions to access or modify data associated with computing devices 602, and so forth.

Other data 636 within the data store(s) 622 may include configurations, settings, preferences, and default values associated with computing devices 602. Other data 636 may also include encryption keys and schema, access credentials, threshold data, and so forth. Other data 636 may additionally include rules or criteria for determining power data 122, when to generate an output 202, determining content for inclusion in outputs 202, and so forth.

In different implementations, different computing devices 602 may have different capabilities or capacities. For example, servers 120 may have greater processing capabilities or data storage capacity than test devices 102.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first device having a first power source;
one or more memories storing computer-executable instructions; and
one or more hardware processors to execute the computer-executable instructions to:
at a first time, determine a first state associated with the first power source;
at a second time after the first time, cause the first device to perform a function that utilizes power from the first power source;
at a third time after the first time, determine a second state associated with the first power source;
determine, based on a first relationship between the first state and the second state, a first quantity of power associated with the function; and
determine an output indicative of the first quantity of power, wherein the output associates the first quantity of power with one or more characteristics of the function.

2. The system of claim 1, wherein:
the first state is indicative of a second quantity of power associated with the first power source at the first time;
the second state is indicative of a third quantity of power associated with the first power source after the first time; and
the first quantity of power is determined based at least in part on a difference between the second quantity and the third quantity.

3. The system of claim 1, further comprising:
a second power source that provides power to the first power source;
wherein:
the first state is indicative of a second quantity of power transferred from the second power source to the first power source before the second time;
the second state is indicative of a third quantity of power transferred from the second power source to the first power source after the second time; and
the first quantity of power is determined based at least in part on a difference between the second quantity and the third quantity.

4. The system of claim 1, wherein:
the first state is indicative of a second quantity of power discharged from the first power source before the second time;
the second state is indicative of a third quantity of power discharged from the first power source after the second time; and
the first quantity of power is determined based at least in part on a difference between the second quantity and the third quantity.

5. The system of claim 1, further comprising computer-executable instructions to:
determine one or more of:
a performance metric associated with the first device at the second time,
a characteristic of a network in communication with the first device, or
a characteristic of a second device in communication with the first device;
wherein the output is further indicative of the one or more of the performance metric, the characteristic of the network, or the characteristic of the second device.

6. The system of claim 1, further comprising computer-executable instructions to:
determine one or more of:
a component of the first device associated with performance of the function,
a count of components of the first device associated with performance of the function, or
a count of actions performed by the first device to perform the function;
wherein the output is further indicative of the one or more of the component, the count of components, or the count of actions.

7. The system of claim 1, further comprising:
a second device having a second power source; and
computer-executable instructions to:
cause the second device to perform the function;
determine a third state associated with the second power source before performance of the function by the second device;
determine a fourth state associated with the second power source one or more of during or after performance of the function by the second device;
determine, based on a second relationship between the third state and the fourth state, a second quantity of power associated with the function;
determine that the first quantity differs from the second quantity by at least a threshold value; and
determine one or more of a characteristic or a component of the first device that differs from the second device;
wherein the output is further indicative of the one or more of the characteristic or the component.

8. The system of claim 1, wherein the second state is associated with performance of a first portion of the function, the system further comprising computer-executable instructions to:
at a fourth time after the third time, cause the first device to perform a second portion of the function;
at a fifth time after the third time, determine a third state associated with the first power source; and
determine a second quantity of power based at least in part on the third state;
wherein the output associates the first quantity with one or more first characteristics of the first portion of the function and the second quantity with one or more second characteristics of the second portion of the function.

9. A method comprising:
causing a first device having a first power source to perform a function that utilizes power from the first power source, wherein the function includes a first portion and a second portion;
determining a first state of the first power source, wherein the first state is associated with performance of the first portion of the function;
determining a second state of the first power source, wherein the second state is associated with performance of the second portion of the function; and
determining an output that associates the first state with one or more first characteristics of the first portion and the second state with one or more second characteristics of the second portion.

10. The method of claim 9, further comprising:
determining a first quantity of power associated with the first power source before performance of the function;
determining, based on the first state and the second state, a second quantity of power associated with the first power source after performance of the function;
determining a third quantity of power associated with performance of the function based on the first quantity and the second quantity; and
including an indication of the third quantity in the output.

11. The method of claim 9, wherein:
the first state is indicative of a first quantity of power transferred to the first power source to maintain a charge level of the first power source during performance of the first portion of the function;
the second state is indicative of a second quantity of power transferred to the first power source to maintain a charge level of the first power source during performance of the second portion of the function; and
the method further comprising:
determining a third quantity of power associated with performance of the function based on the first quantity and the second quantity; and
including an indication of the third quantity in the output.

12. The method of claim 9, wherein:
the first state is indicative of a first quantity of power discharged from the first power source during performance of the first portion of the function;
the second state is indicative of a second quantity of power discharged from the first power source during performance of the second portion of the function; and
the method further comprising:
determining a third quantity of power associated with performance of the function based on the first quantity and the second quantity; and
including an indication of the third quantity in the output.

13. The method of claim 9, wherein the first device is caused to perform at least one of the first portion or the second portion of the function in response to a quantity of power stored in the first power source being greater than a threshold value.

14. The method of claim 9, further comprising:
determining that a difference between the first state and the second state exceeds a threshold value;
determining a first characteristic of the first portion of the function that differs from a second characteristic of the second portion of the function; and including an indication of one or more of the first characteristic or the second characteristic in the output.

15. The method of claim 9, further comprising:
causing a second device having a second power source to perform the function;
determining a third state of the second power source, wherein the third state is associated with performance of the first portion of the function using the second device;
determining a fourth state of the second power source, wherein the fourth state is associated with performance of the second portion of the function using the second device;
determining one or more of: a difference between the first state and the third state that exceeds a threshold value, or a difference between the second state and the fourth state that exceeds the threshold value;
determining one or more of a characteristic or a component of the first device that differs from the second device; and
including an indication of the one or more of the characteristic or the component in the output.

16. A system comprising:
a first device having a first power source;
a second device having a second power source;
one or more memories storing computer-executable instructions; and
one or more hardware processors to execute the computer-executable instructions to:
cause the first device to perform a first function that utilizes power from the first power source;
determine a first state of the first power source, wherein the first state is associated with performance of the first function by the first device;
cause the second device to perform a second function that utilizes power from the second power source;
determine a second state of the second power source, wherein the second state is associated with performance of the second function by the second device; and
determine an output based on the first state and the second state, wherein the output associates a first quantity of power associated with the first state with one or more of: a characteristic of the first function or a characteristic of the first device, and a second quantity of power associated with the second state with one or more of: a characteristic of the second function or a characteristic of the second device.

17. The system of claim 16, further comprising computer-executable instructions to:
determine a portion of a capacity of the first power source associated with the first quantity of power;
wherein the output further includes an indication of the portion of the capacity.

18. The system of claim 16, further comprising computer-executable instructions to:
determine that the first quantity of power deviates from a threshold value; and
in response to the first quantity of power deviating from the threshold value, include, in the output, an indication of an issue associated with power use of the first device.

19. The system of claim 16, further comprising computer-executable instructions to:
determine that a first difference between the first quantity of power and the second quantity of power exceeds a threshold value; and
determine a second difference between the characteristic of the first device and the characteristic of the second device;
wherein the output further includes an indication of one or more of the characteristic of the first device, the characteristic of the second device, or the second difference.

20. The system of claim 16, wherein the first state is further associated with a first current of the first power source during performance of the first function by the first device, the system further comprising computer-executable instructions to:
determine a third quantity of power based on the first current;
wherein the output further includes an indication of the third quantity of power.

* * * * *